(12) United States Patent
Winoto et al.

(10) Patent No.: US 10,897,705 B2
(45) Date of Patent: Jan. 19, 2021

(54) SECURE COMMUNICATION BETWEEN A CONTACT LENS AND AN ACCESSORY DEVICE

(71) Applicant: SPY EYE, LLC, Palo Alto, CA (US)

(72) Inventors: Renaldi Winoto, Los Gatos, CA (US); Paul Lambert, Mountain View, CA (US); Ashkan Olyaei, San Jose, CA (US); Michael Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 196 days.

(21) Appl. No.: 16/019,276

(22) Filed: Jul. 19, 2018

(65) Prior Publication Data

US 2020/0029208 A1    Jan. 23, 2020

(51) Int. Cl.
| | | |
|---|---|---|
| *H04K 1/00* | (2006.01) |
| *H04W 12/02* | (2009.01) |
| *H04L 29/06* | (2006.01) |
| *H04L 9/06* | (2006.01) |
| *H04L 9/32* | (2006.01) |
| *G06F 21/62* | (2013.01) |
| *H04W 12/06* | (2009.01) |
| *H04W 12/04* | (2009.01) |
| *H04L 9/12* | (2006.01) |
| *H04L 12/26* | (2006.01) |
| *G02C 7/04* | (2006.01) |

(Continued)

(52) U.S. Cl.
CPC .............. *H04W 12/02* (2013.01); *G02C 7/04* (2013.01); *G02C 11/10* (2013.01); *G06F 21/602* (2013.01); *G06F 21/6245* (2013.01); *H04L 9/065* (2013.01); *H04L 9/0618* (2013.01); *H04L 9/12* (2013.01); *H04L 9/3278* (2013.01); *H04L 43/0876* (2013.01); *H04L 43/16* (2013.01); *H04L 63/0442* (2013.01); *H04W 12/04* (2013.01); *H04W 12/06* (2013.01); *H04L 2209/805* (2013.01)

(58) Field of Classification Search
CPC ......... G02C 11/10; G02C 7/04; G06F 21/602; G06F 21/6245; G06F 21/86; H04L 63/0442; H04L 2209/805; H04L 2209/80; H04L 9/0618; H04L 9/065; H04L 9/12; H04L 9/3278; H04W 12/02; H04W 12/04; H04W 12/06
USPC ............................. 380/274; 713/168; 726/3
See application file for complete search history.

(56) References Cited

U.S. PATENT DOCUMENTS

| | | |
|---|---|---|
| 4,495,117 A | 1/1985 | Feurer |
| 7,701,299 B2 | 4/2010 | Chenakin |
| 8,608,310 B2 | 12/2013 | Otis |

(Continued)

*Primary Examiner* — Samson B Lemma
(74) *Attorney, Agent, or Firm* — North Weber and Baugh LLP; Michael North

(57) ABSTRACT

Described herein are systems and methods that allow for secure wireless communication between a contact lens system and an accessory device to protect sensitive data and prevent unauthorized access to confidential information. In certain embodiments, tampering attempts by potential attackers are thwarted by using a Physically Unclonable Functions (PUF) circuit that is immune to reverse engineering. In addition, sensors monitor a to-be-protected electronic device to detect tampering attempts and physical attacks to ensure the physical integrity of the communication system.

14 Claims, 11 Drawing Sheets

(51) Int. Cl.
*G02C 11/00* (2006.01)
*G06F 21/60* (2013.01)

(56) References Cited

U.S. PATENT DOCUMENTS

| | | |
|---|---|---|
| 8,764,185 B1 | 7/2014 | Biederman |
| 8,870,370 B1 | 10/2014 | Otis |
| 8,917,804 B2 | 12/2014 | Sano |
| 9,024,727 B1 | 5/2015 | Otis |
| 9,298,020 B1 | 3/2016 | Etzkorn |
| 9,338,622 B2 | 5/2016 | Bjontegard |
| 9,641,183 B2 | 5/2017 | Wentzloff |
| 9,783,159 B1 | 10/2017 | Potter |
| 9,843,385 B2 * | 12/2017 | Deyle ............ H04B 10/116 |
| 9,854,437 B1 * | 12/2017 | Yeager ............ G02C 7/083 |
| 9,860,098 B2 | 1/2018 | Wilkerson |
| 9,933,620 B2 | 4/2018 | Van Heugten |
| 10,201,297 B1 | 2/2019 | Biederman |
| 2002/0181417 A1 | 12/2002 | Malhotra |
| 2005/0154896 A1 * | 7/2005 | Widman ............ H04L 67/146 |
| | | 713/182 |
| 2006/0232426 A1 | 10/2006 | Sabeta |
| 2006/0267768 A1 | 11/2006 | Sabeta |
| 2007/0274626 A1 | 11/2007 | Sabeta |
| 2008/0097551 A1 * | 4/2008 | Dicks ............ G06Q 50/24 |
| | | 607/60 |
| 2010/0065625 A1 | 3/2010 | Sabeta |
| 2010/0121315 A1 * | 5/2010 | Trovato ............ H04L 9/3278 |
| | | 604/890.1 |
| 2010/0259719 A1 | 10/2010 | Sabeta |
| 2011/0028807 A1 | 2/2011 | Abreu |
| 2011/0084834 A1 * | 4/2011 | Sabeta ............ A45C 11/005 |
| | | 340/540 |
| 2011/0261766 A1 | 10/2011 | Tang |
| 2012/0030043 A1 * | 2/2012 | Ross ............ G06Q 30/06 |
| | | 705/16 |
| 2012/0063340 A1 | 3/2012 | Waters |
| 2012/0155549 A1 | 6/2012 | Oh |
| 2012/0257585 A1 | 10/2012 | Sydor |
| 2012/0281181 A1 | 11/2012 | Chen |
| 2013/0242262 A1 | 9/2013 | Lewis |
| 2013/0259010 A1 | 10/2013 | Jechoux |
| 2013/0346168 A1 | 12/2013 | Zhou |
| 2014/0010089 A1 | 1/2014 | Cai |
| 2014/0143064 A1 | 5/2014 | Tran |
| 2014/0178029 A1 | 6/2014 | Raheman |
| 2014/0222462 A1 | 8/2014 | Shakil |
| 2014/0240655 A1 | 8/2014 | Pugh |
| 2015/0053067 A1 | 2/2015 | Goldstein |
| 2015/0054621 A1 * | 2/2015 | Lin ............ G06K 19/0716 |
| | | 340/10.1 |
| 2015/0057516 A1 | 2/2015 | Mujeeb-U-Rahman |
| 2015/0119748 A1 | 4/2015 | Lai |
| 2015/0156645 A1 | 6/2015 | Ponnuswamy |
| 2015/0173893 A1 | 6/2015 | Portney |
| 2015/0235267 A1 | 8/2015 | Steube |
| 2015/0261294 A1 | 9/2015 | Urbach |
| 2015/0281411 A1 | 10/2015 | Markus |
| 2015/0326659 A1 | 11/2015 | Cheng |
| 2015/0363614 A1 * | 12/2015 | Yeager ............ G06K 19/073 |
| | | 340/10.5 |
| 2016/0103338 A1 | 4/2016 | Hart |
| 2016/0174109 A1 | 6/2016 | Yerramalli |
| 2017/0006632 A1 | 1/2017 | Elliott |
| 2017/0012972 A1 | 1/2017 | Tanaka |
| 2017/0042480 A1 | 2/2017 | Gandhi |
| 2017/0093727 A1 | 3/2017 | Chen |
| 2017/0168322 A1 | 6/2017 | Toner |
| 2017/0338985 A1 | 11/2017 | Wilkerson |
| 2017/0371184 A1 | 12/2017 | Shtukater |
| 2018/0017814 A1 | 1/2018 | Tuan |
| 2018/0120568 A1 | 5/2018 | Miller |
| 2018/0136492 A1 | 5/2018 | An |
| 2018/0149884 A1 | 5/2018 | Miller |
| 2018/0160321 A1 | 6/2018 | Doherty |
| 2018/0173304 A1 | 6/2018 | Lemoff |
| 2018/0203252 A1 | 7/2018 | Perozziello |
| 2018/0203260 A1 | 7/2018 | Blum |
| 2018/0210235 A1 | 7/2018 | Boss |
| 2018/0224669 A1 | 8/2018 | Shtukater |
| 2018/0224671 A1 | 8/2018 | Lemoff |
| 2018/0249151 A1 | 8/2018 | Freeman |
| 2018/0316224 A1 | 11/2018 | Maynard |
| 2018/0335836 A1 | 11/2018 | Miller |
| 2018/0348620 A1 | 12/2018 | Miller |
| 2018/0375703 A1 | 12/2018 | Kellogg |
| 2019/0041663 A1 | 2/2019 | Goldstein |
| 2019/0050643 A1 * | 2/2019 | Ulman ............ G06K 9/00604 |
| 2019/0132732 A1 | 5/2019 | Bharti |
| 2019/0265473 A1 | 8/2019 | Shahmohammadi |
| 2019/0273727 A1 * | 9/2019 | Eckert ............ H04L 63/1441 |
| 2019/0331937 A1 | 10/2019 | Owens |
| 2019/0332168 A1 | 10/2019 | Weldemariam |

* cited by examiner

500

SECURE COMMUNICATION BETWEEN A CONTACT LENS AND AN ACCESSORY DEVICE

A. TECHNICAL FIELD

The present disclosure relates generally to secure electronic systems and methods employed within a wearable contact lens and accessory device. More particularly, the present disclosure relates to systems and methods for securely transmitting data between a contact lens and accessory device, securely storing data within the contact lens or accessory device, and thwarting tampering attempts in the system.

B. BACKGROUND

Developments in mobile communications combined with ever-increasing computing power have enabled processing and real-time feedback for wearable devices, such as heart rate meters, pedometers, and smart watches that allow numerous bodily conditions to be measured. In addition, recent advances in miniaturization allow electronic monitoring systems to be attached to the human body to provide information or entertainment to the wearer in a continually shrinking footprint. For example, intelligent spectacles/glasses can wirelessly communicate with a server and use its lenses to display to the wearer's eye an overlay over real-world objects.

While the individual purposes and functions of these wearables differ from device-to-device, aspects of sensing, monitoring, and processing data remain common to many such devices. These miniaturized devices that interface directly with an individual and extract private information need to ensure that this information is securely stored and transmitted to other devices. This miniaturization calls for low power solutions that are at odds with today's common power-hungry processors that perform vast amounts of calculations, including cryptographic calculations. This problem is further complicated by the footprint limitations of these devices and other issues known to one of skill in the art. Accordingly, what is needed are systems and methods that overcome security issues for miniaturized circuits on wearables and systems and other limitations that remain largely unresolved.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

DETAILED DESCRIPTION OF EMBODIMENTS

Figure 1:
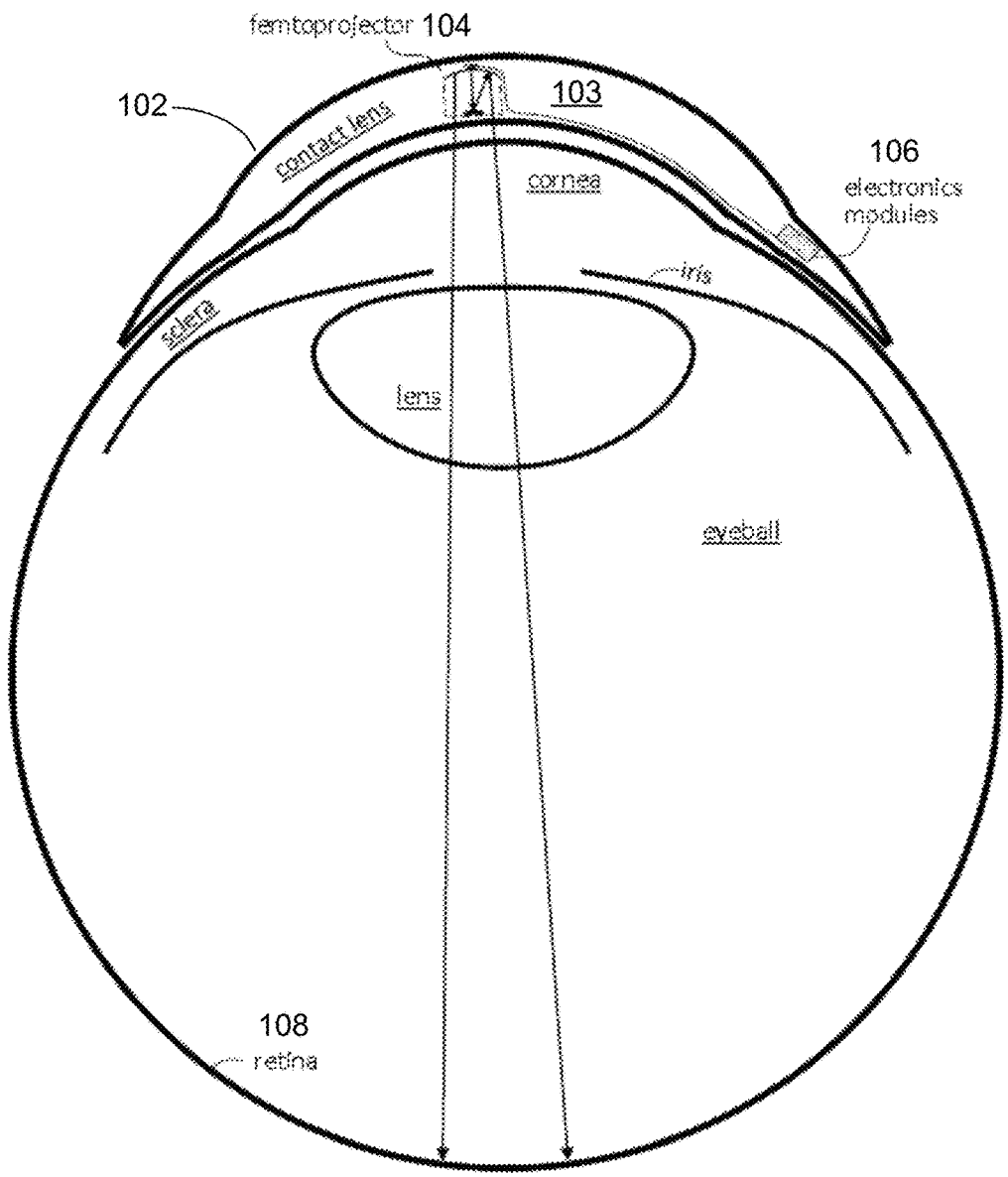
FIG. 1 is a general illustration of a secure electronic contact lens system, according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

In this document the terms "sensor" refers to any device capable of acquiring information. Information can be any data related to physiological conditions and activities, and physical data, such as spatial, temporal, and environmental information, including hardware-specific information. "Accessory device" includes communications devices capable of receiving, transmitting, storing, and processing wireless signals to and from a contact lens. This accessory device may be circuitry embedded within jewelry or necklace, a smartphone, an electronic reader, or any other circuitry that is capable of communication with the contact lens.

FIG. 1 is a general illustration of a secure electronic contact lens system according to various embodiments of the present disclosure. Electronic contact lens 102 comprises contact lens material 103, projector 104 and one or more electronic modules 106. Contact lens material 103 may be made from relatively rigid material that provides sufficient structural support for mounting electronic module(s) 106 on contact lens 102. In certain embodiments, projector 104, depicted in FIG. 1 is a femtoprojector, which is a miniaturized video or image projector and may couple to module(s) 106 that comprise electronic circuits and devices, such as a transceiver circuit, sensors, and data processing devices not shown in FIG. 1. One skilled in the art will recognize that module(s) 106 may perform a variety of functions, some or all of which may include the storage or transmission of sensitive data that should be protected from third-parties.

Also not shown in FIG. 1 are devices, such as an accessory device designed to communicate with contact lens 102, e.g., via electronic module(s) 106. In embodiments, wireless communication between the accessory device and the contact lens 102 may be established in a secure manner such that data communicated within this wireless connection is secure from third-party interference. This securitization of data not only includes protecting data in transit within a wireless channel but also data stored on either the accessory device or contact lens 102.

Figure 5:
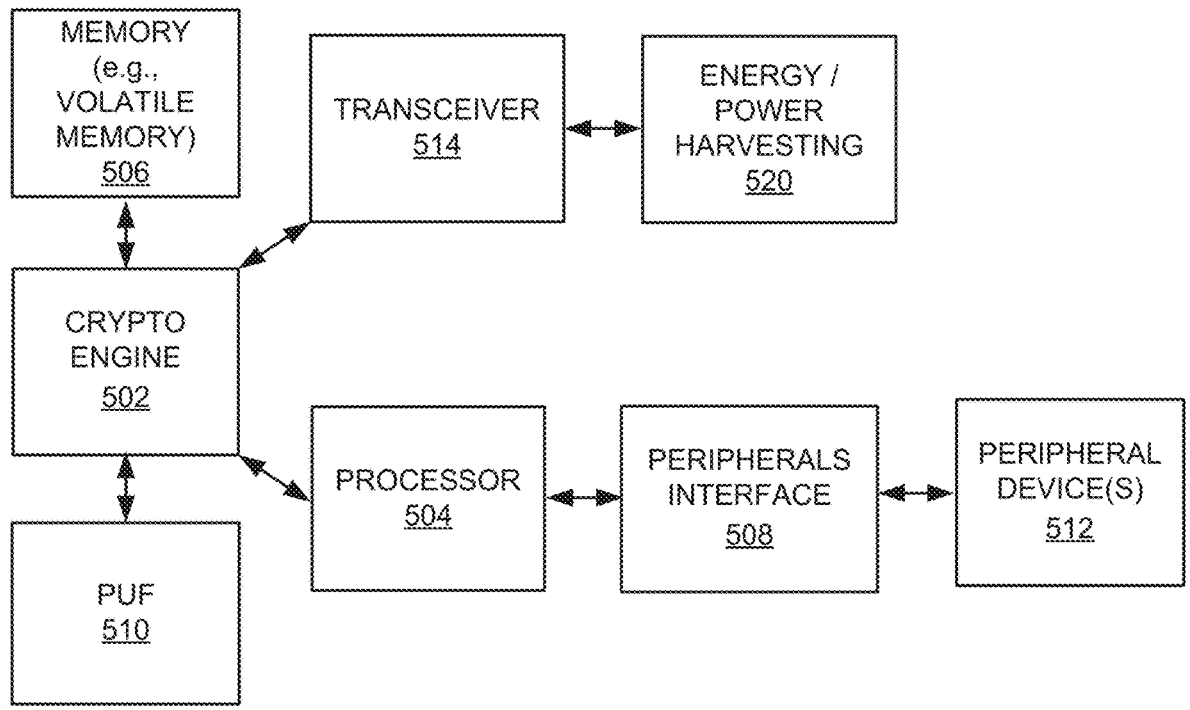
FIG. 5 illustrates a PUF-based security system for a secure electronic contact lens system, according to various embodiments of the present disclosure.

In operation, contact lens 102 may be worn like a regular contact lens. Projector 104 may project an image onto the wearer's retina 108. In embodiments, the image may be generated based on data provided by electronic module(s) 106. Electronic module(s) 106, in turn, may be communicatively coupled to and receive data from an accessory device that, in embodiments, may also be used to provide power to electronic module(s) 106 on contact lens 102. In embodiments, energy may be wirelessly transferred from the accessory device to electronic module(s) 106. For example, the accessory device may produce energy in the form of electromagnetic radiation that can be harvested by an energy harvesting circuit on contact lens 102, as shown in FIG. 5 and regulated such that a consistent power source is realized locally on the contact lens 102.

It is understood that contact lens 102 in FIG. 1 may be designed to be comfortably worn by using contact lens material 103 that comprises any material known in the art to reduce the likelihood of biological incompatibilities with the wearer's eyes. For example, contact lens 102 may be manufactured using biocompatible, oxygen permeable material that provides sufficient oxygenation to the eye to reduce or eliminate possible irritations of the eye.

Certain embodiments discussed herein benefit from security features, such as encryption and decryption. In general, most cryptographic operations are computationally expensive and thus have high computational power requirements. Yet, it is desirable to keep the amount of transferred and stored energy as small as possible to reduce the amount of heat that is inherent to and a side-effect of virtually any physical power conversion process. Additionally, the processing or calculations of large-numbers that are commonly used in asymmetric encryption procedures present challenges in implementing encryption operations in a low-power, footprint-limited scenario such as one implemented on a contact lens.

Especially in unconventional applications and environments such as here, in scenarios that would result in a thermal hot spot caused by an unacceptably high level of power density in a localized area, the use of, for example, conventional random access memory would be difficult. Finally, particular conventional non-volatile memory often requires relatively high voltages and/or currents that may not be available for use on contact lens 102.

Accordingly, it would be desirable to have high-throughput systems and methods that do not require power-hungry processors and storage devices that may adversely affect the use of contact lens 102 and, in the worst case, render certain features such as cryptographic security features difficult to implement. Therefore, certain embodiments disclosed herein allow for safety features to co-exist with miniaturization, low-power utilization, and other beneficial features.

Figure 2:
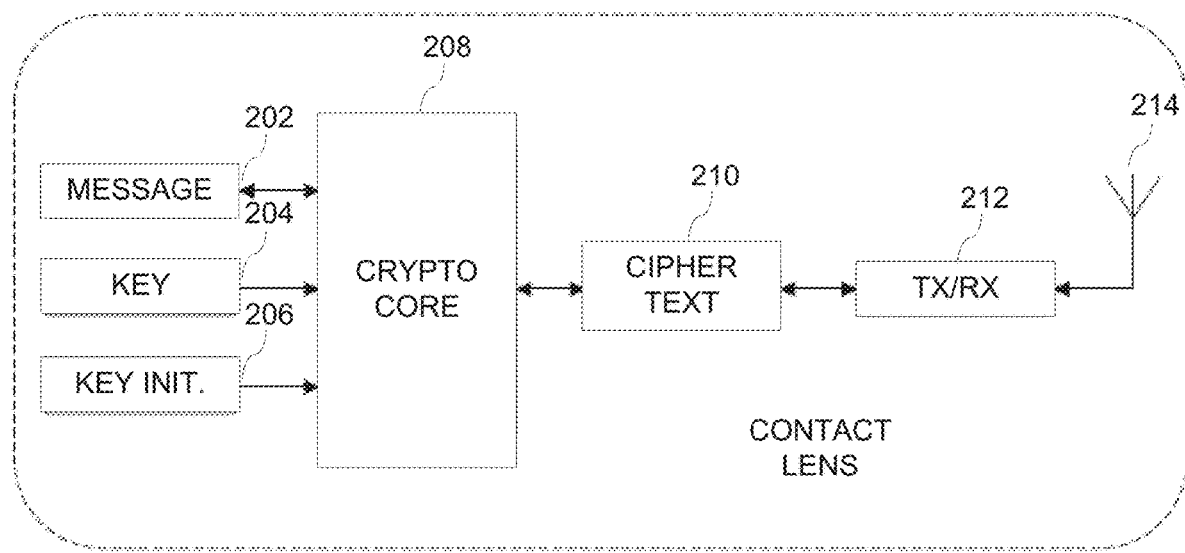
FIG. 2 illustrates a cryptographic system for use in a contact lens system, according to various embodiments of the present disclosure.

FIG. 2 illustrates a cryptographic system for use in a contact lens system according to various embodiments of the present disclosure. Cryptographic system 200 comprises key repository 204, key initialization system 206, a cipher text channel 210 that uses, e.g., a stream cipher or block encryption, transceiver circuit 212, and antenna 214. As those skilled in the art will appreciate, devices in system 200 should be positioned to minimize electric interference. For example, antenna 214 should be placed at a distance that is sufficiently far away from processing electronics such as crypto core 208 to avoid unwanted electromagnetic interference that, otherwise, may corrupt data in nearby signal paths. In addition, devices should be positioned sufficiently far away from any optical paths of the contact lens, e.g., at or near the periphery of the contact lens such as to avoid possible optical interference with the transmission of light, e.g., caused by unwanted reflections. It is noted that, in embodiments, one or more components of system 200 may be used in one or more accessory device(s) (not shown).

Various embodiments of the invention provide for securitization of data within a wireless channel between contact lens 102 and an accessory device. This securitization may include the use of cryptographic operations to encrypt data using either a stream cypher or block encryption technique prior to transmission within the wireless channel. For illustrative purposes, a cryptographic process on contact lens 102 is described in relation to the structural components identified above. The crypto core 208 may receive message 202 (e.g., a plain text message) and key 204 (e.g., a fixed key) to perform any number of cryptographic operations on message 202 to encrypt the text therein using key 204 to generate cipher text 210 (e.g., text that comprises a challenge code) that then may be transmitted via antenna 214 to an accessory device. One skilled in the art will recognize that the message 202 may originate from a plurality of sources and may be any type of information including sensor data, instructions, video data, etc. In embodiments, crypto core 208 may receive key 204 from a key repository, and key 204 may be stored in one-time programmable memory at a factory during a manufacturing process.

In embodiments, system 200 uses key initialization system 206 to protect fixed key 204 by generating a derivative key. In embodiments, each time a key (e.g., 204) is used, a new key may be generated using any key initialization scheme known in the art, such as an Advanced Encryption Standard-Synthetic Initialization Vector (AES-SIV) scheme. One skilled in the art will recognize that the use of both a key 204 and key initialization 206 allow for various scenarios in which a secure key is generated and used during a communication session. These scenarios may include, e.g., key-encrypting-key (KeK) techniques, key authentication and handshake techniques, dynamic key generation (e.g., such as the use of a Physically Unclonable Function (PUF) key derivation technique), etc.

It is noted that cryptographic system 200 illustrated in FIG. 2 is not limited to the detail shown there or described in the accompanying text. For example, as those skilled in the art will appreciate, while antenna 214 may act as both a receiving antenna and a transmitting antenna, a suitable communication system may comprise, e.g., two separate antennae—one for receiving data and one for transmitting data. In addition, cryptographic system 200 may comprise a dedicated antenna that facilitates inductive charging. In addition, in embodiments, antenna 214 may be used to charge a battery or capacitor, e.g., via a charging circuit (both not shown) that may utilize any inductive charging method known in the art. One skilled in the art will recognize that the above described security device will support a plurality of security features implementable on a contact lens, a few of which are described in detail below.

Figure 3:
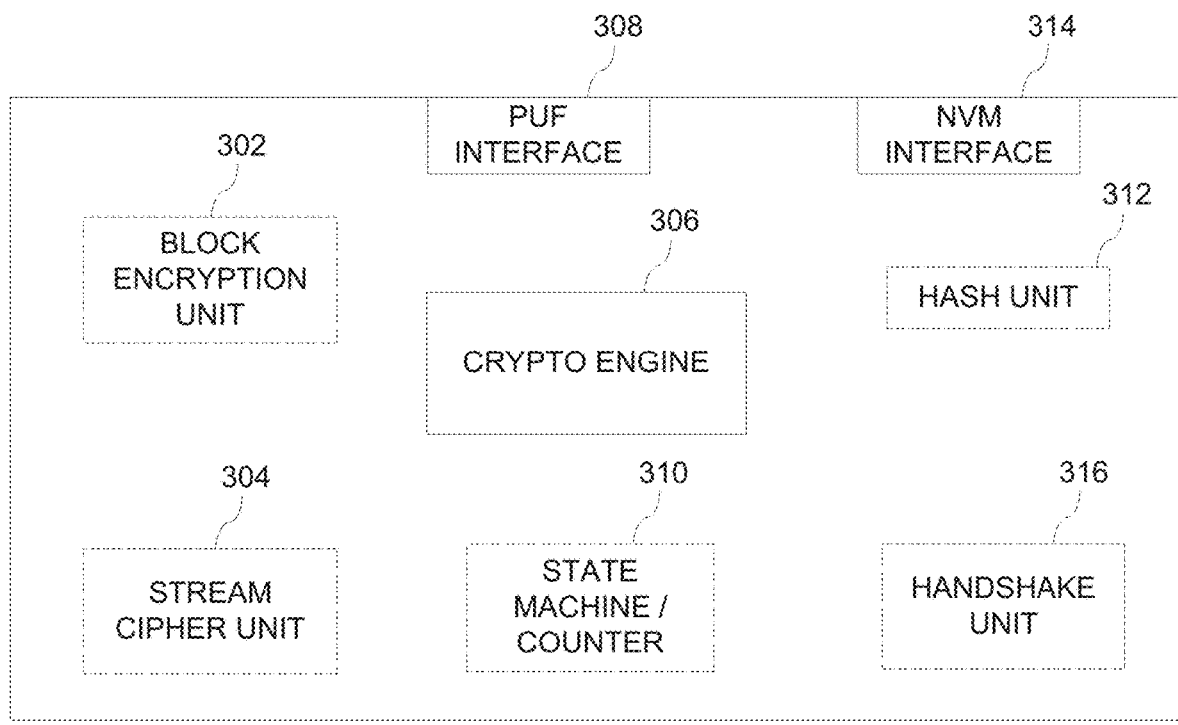
FIG. 3 illustrates an exemplary crypto core as may be used in the cryptographic system show in FIG. 2.

FIG. 3 illustrates an exemplary crypto core that may be used in the cryptographic system shown in FIG. 2. The crypto core 300 generates and/or retrieves keys that are implemented during a communication session to encrypt and decrypt data both on the transmit and receive side. This encryption process includes an initial handshake during which information is exchanged between both sides of the session such that each side is able to maintain a secure and encrypted communication session. As previously described, the implementation of a crypto core 300 on a contact lens presents unique challenges including power issues, footprint, heat generation, chemical issues and other design constraints known to one of skill in the art.

Crypto core 300 may be implemented in an ASIC that is mounted onto or embedded in a contact lens system according to various embodiments of the present disclosure. In embodiments, crypto core 300 may comprise any combination of circuit components, such as block encryption unit 302, stream cipher unit 304, crypto engine 306, PUF interface 308, state machine/counter 310, hash unit 312, NVM interface 314, and handshake unit 316. For example, circuit components indicated by dashed lines in FIG. 3 may be optional. In embodiments, crypto engine 306 may comprise logic to control any number of components in crypto core 300. NVM interface 314 may be coupled to one or more storage devices (not expressly shown).

In operation, crypto core 300 may perform tasks of creating, storing, encrypting, authenticating, and transmitting data comprising sensitive data, such as confidential health information and encryption keys. As depicted in FIG. 3, crypto core 300 comprises computing resources and may be implemented using various secure microcontrollers known in the art. Components may comprise a crypto co-processor and/or a floating point co-processor to perform mathematical computations. NVM interface 314 may be used exchange data comprising encrypted and decrypted messages and encryption/decryption keys to and from crypto core 300.

In embodiments, block encryption unit 302 and/or stream cipher unit 304 perform encryption operations to encrypt data that has been generated by a projector or other circuitry in a contact lens system according to various embodiments of the present disclosure. In embodiments, handshake unit 316 may apply a handshake protocol to received and transmitted data to exchange a session key as described further below. State machine/counter 310 may be implemented as a resettable counter that is incremented in response to a message being transmitted or received, e.g., via NVM interface 314. In embodiments, state machine 310 may also be used to manage packet loss in a wireless network application.

The state machine 310 may also be used to ensure the integrity of the wireless communication between the contact lens and accessory device. For example, in embodiments, state machine 310 may monitor a count associated with a cryptographic system used in a contact lens system and a count associated with a cryptographic system that is used in an access device. Once the counts no longer match, remedial action, such as packet recovery or interrupt procedure, may be initiated. In embodiments, packet loss may be tolerated to a limited degree or a count mismatch may be defined in which a system tolerance is set. State machine 310 may be configured to permit communication, for example, even if the counts have become different by a certain difference. As a result, an exact match between two counters is not required at all times.

In embodiments, PUF interface 308 receives a PUF-generated key that may be used by any of crypto engine 306, block encryption unit 302, and stream cipher unit 304. A PUF that generates the key is described in greater detail with reference to FIG. 5. In embodiments, a second key may be derived from a PUF-generated key that serves as a master key and that may be used to encrypt the second key that may be stored in non-volatile memory and aid to minimize exposure of the master key itself.

In embodiments, cryptographic engine 306 may implement any cryptographic algorithm recognized by one of skill in the art, e.g., a symmetric algorithm such as Advanced Encryption Standard (AES) or Triple DES) or a stream cipher implementing a bit-by-bit encryption technique. It is understood that cryptographic engine 306 may process a secret together with other data or software to provide functional protection.

In embodiments, a PUF-generated key is loaded into and stored in cryptographic engine 306. Upon detection of a security breach such as a tamper attempt, the key may be instantly erased from volatile memory (not shown). Certain embodiments advantageously also eliminate the need to store keys in non-volatile memory and, thus, render crypto core 300 immune to reverse engineering and other advanced tools employed by sophisticated attackers.

Ideally, crypto core 300 has a very low power consumption and requires no chemical energy storage device, such as a battery that may be considered a potential biological hazard and, thus, undesirable in a contact lens system. Therefore, in embodiments, stream cipher unit 304 may be used to perform some or all of the encryption operations of crypto core 300.

It is understood that any part of crypto core 300 may be implemented in an integrated circuit. It is further understood that the functionalities shown for crypto core 300 may operate to support various embodiments of any cryptographic system that may be differently configured and include different components as those shown in FIG. 3.

Figure 4:
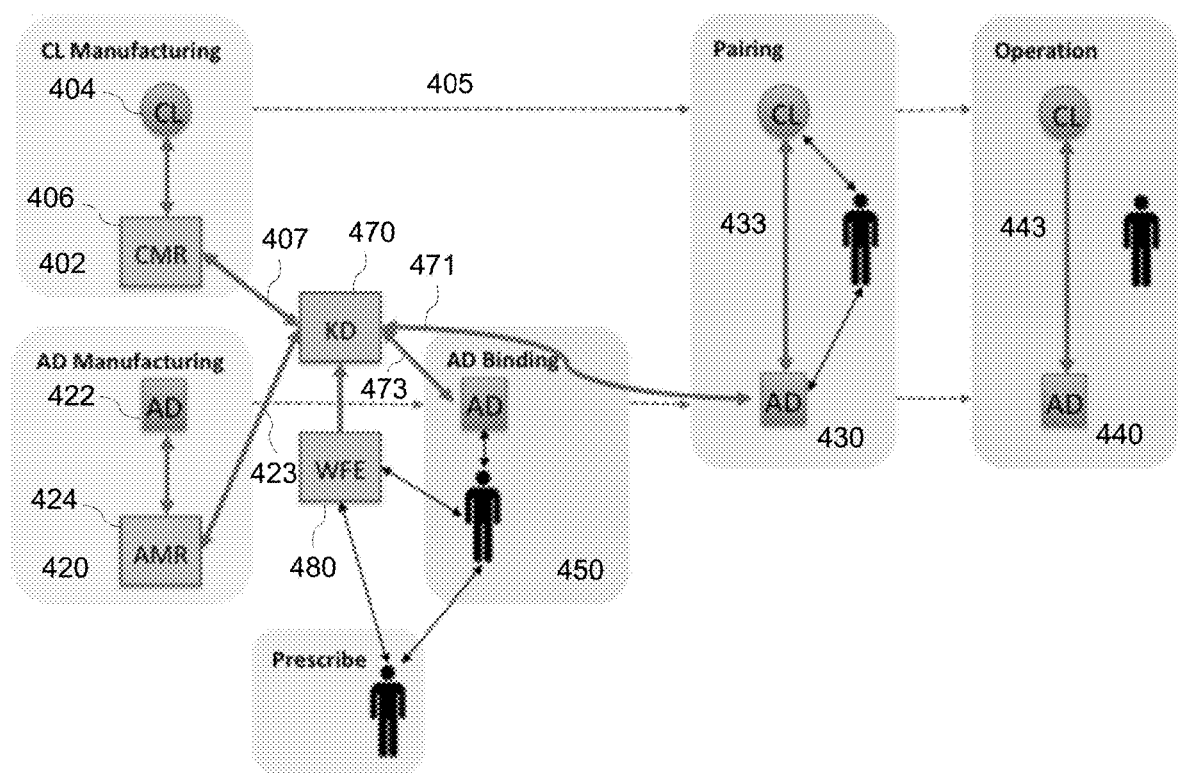
FIG. 4 is an exemplary data flow map for a secure contact lens system with encrypted communication, according to various embodiments of the present disclosure.

FIG. 4 is an exemplary data flow map for a secure contact lens system with encrypted communication, according to various embodiments of the present disclosure. Map 400 comprises various stages at which data is created, encrypted/decrypted, and exchanged. As depicted in FIG. 4, stages may comprise contact lens manufacturing 402, accessory device manufacturing 420, paring 430, operation 440, and accessory device binding 450. In embodiments, data may be exchanged between one or more components that may comprise contact lens (CL) 404, contact lens manufacturing registrar (CMR) 406, accessory device (AD) 422, accessory device manufacturing registrar (AMR) 424, key dispenser (KD) 470, and web front end (WFE) 480. Communication paths may include, for example, the following connections CL-CMR 405, CMR-KD 407, AMR-KD 423, AD-KD when binding 473, AD-KD when pairing 471, CL-AD when pairing 433, and CL-AD 443 in operation.

As shown, a contact lens manufacturer embeds 406 certain circuitry on the contact lens 404 during the manufacturing process. For security purposes, the contact lens manufacturer 406 may include a specific key and store the key on the contact lens. In one embodiment, the key is burned into one-time programmable memory on the contact lens. Similarly, an accessory device manufacturing registrar 424 may load certain circuitry including a key into an accessory device 422 that will enable encrypted communication. This information will be provided to a key dispenser 470 which is used to bind the specific accessory device to a user 433, 471, 473. As a result, both the contact lens and accessory device both with security circuitry/keys that enable a secure and user-specific security procedures 443.

FIG. 5 illustrates a PUF-based security system for a secure electronic contact lens system, according to various embodiments of the present disclosure. System 500 may comprise crypto engine 502, processor 504, internal or external memory 506, peripheral interfaces 508, PUF 510, peripheral devices 512, transceiver 514, and energy/power harvesting module 520. Processor 504 may be implemented as a secure microcontroller. System 500 may include memory 506, e.g., one time programmable (OTP) memory, random-access memory (RAM), or and read-only memory (ROM). In embodiments, memory 506 comprises volatile memory that holds encryption/decryption key(s) and that is powered by a power source, such as a battery or capacitor (not shown) that provides continuous power to hold the key(s) in memory 506. This is advantageous for circumstances when, e.g., power becomes temporarily unavailable to system 500.

In embodiments, energy/power harvesting module 520 may utilize active energy harvesting methods that provide power to memory 506 to hold a key and implement security procedures. In certain embodiments, the harvesting module 520 includes a regulator that regulates power delivered to one or more of the components on the contact lens. In embodiments, instead of relying on the availability of harvesting module 520 for uninterrupted power to hold a key, a key may be generated by PUF 510 as described next.

PUF 510 may be a device or structure (physical, chemical, etc.) that, in embodiments, generates a key by taking advantage of a signature that is based on microscopic but unique manufacturing tolerances among devices that, by virtue of manufacturing techniques employed in semiconductor processing (e.g., non-uniform deposition and etching) are inherent to every semiconductor device. As a result, nearly identical circuits can produce different but device-unique outcomes to the same input. PUF design takes advantage of such variations that typically follow a Gaussian distribution to produce sequences of random but repeatable data, such as unique cryptographic keys that may be used to identify a device or perform other authentication functions. Absent extremely complex measurements at the component level, such minute but characteristic physical differences cannot be detected or copied, thus, providing a simple yet strong security feature.

Ideally, a PUF 510 is easily implemented, e.g., as an integrated circuit, but difficult to replicate. In embodiments, PUF 510 may provide a large number of challenge and response sets to make guessing an appropriate response extremely difficult, thus, rendering an attack on PUF 510 impractical. In electronic system 500, PUF 510 provides a secure method of deriving a unique code from a silicon-based electronic device without embedding memory cells or registers that could be counterfeited. For example, PUF 510 may receive, from crypto engine 502, a challenge variable having a length of n-bits and generate an m-bits long response that is a unique function of both the challenge and unique manufacturing variation inherent in the integrated circuit. PUF 510, in response to receiving a challenge, may output a secret PUF response to the challenge that is unique to the manufactured PUF circuit.

It is understood, that for any a given device, two responses to the same challenge applied to the same PUF 510 in an integrated circuit need not necessarily be identical in terms of bits, but rather may deviate a certain distance away from an ideal response caused by environmental factors, such as temperature changes, material aging effects, and other imperfections that may give rise to bit errors in the PUF response.

In embodiments, PUF 510 may be used for both authentication and secret key generation. Authentication may be performed using a PUF response that is sufficiently close to the ideal response, such that minor errors in the PUF response may be acceptable to a certain degree. For example, a 128-bit challenge may generate a 128-bit response having a 10-bit average difference—an uncertainty herein referred to as noisy bits—for each response, which is sufficiently high for authentication purposes as the level of accuracy suffices to generate a relatively unique response from the PUF circuit such that it becomes very unlikely that another PUF circuit is capable of correctly generating the same amount of bits due to the fact that a very small change at the input of a PUF circuit generates a very large change at the output. For example, changing the single bit of at the input signal results in a variation of about 50% in the output signal, thus, rendering the PUF result unreliable.

In embodiments, in a secret key generation application, PUF 510 may be used to generate a secret key, i.e., a number of highly repeatable secret bits that may be used as symmetric key bits or as a random seed, for example, to generate a public/private key pair. In embodiments, error correction circuitry (not shown) may be used to perform mathematical error correction that complies with requirements that are more stringent than those for an authentication process. Bit error correction may thus correct for noisy bits in a sequence that are caused the above-mentioned environmental variations that may affect PUF 510. It is noted that, in embodiments, the functions of PUF 510 may be performed by any other suitable circuit that is designed to provide non-discoverable, unique, and random values that may be used to generate random keys.

Peripheral interfaces 508 may comprise, for example, sensors that may be designed to measure and monitor diagnostic sensor data or environmental parameters, such as temperature, wetness, light intensity, and other characteristic variables.

It is noted that cryptographic signatures generated by crypto engine 502 may use an authentication algorithm such as an AES with Message Authentication Code (AES-MAC), a Secure Hash Algorithm (any version of SHA, such as SHA-3) to derive a fingerprint of the data to be signed, asymmetric cryptographic protocols such as RSA, a Digital Signature Algorithm (DSA), and/or Elliptic Curve Digital Signature Algorithm (ECDSA). One skilled in the art will recognize that this list of authentication algorithms is not exhaustive and may change over time as new algorithms are introduced, or existing algorithms are deprecated as cryptoanalysis advances over time.

Figure 6:
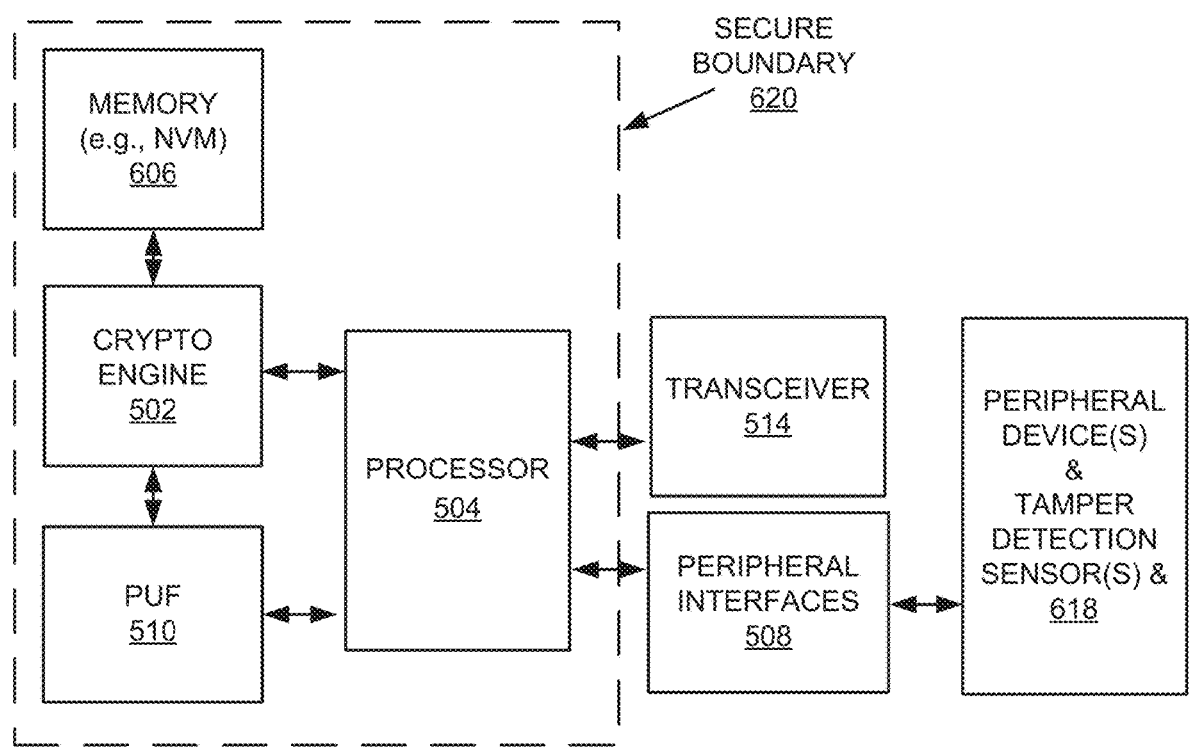
FIG. 6 illustrates a secure boundary that protects against unauthorized access to certain components in a secure electronic accessory system according to various embodiments of the present disclosure.

FIG. 6 illustrates a secure boundary that protects against unauthorized access to certain components in a secure electronic accessory system according to various embodiments of the present disclosure. For clarity, components similar to those shown in FIG. 5 are labeled in the same manner. For purposes of brevity, a description or their function is not repeated here.

As depicted in FIG. 6, electronic accessory system 600 comprises a secure boundary 620 that covers crypto engine 502, processor 504, memory 606, peripheral interfaces 508, and PUF 510. However, this is not intended as a limitation on the scope of the disclosure as secure boundary 620 may cover or exclude any number of components. In embodiments, rather than relying on software, cryptographic engine 502 may be implemented as a hardware engine that performs cryptographic operations, such as data encryption, data decryption and integrity checks. The hardware engine may facilitate increased reaction to fault attacks and enhanced performance for data encryption or decryption. In addition, in embodiments, system 600 may comprise one or more tamper detection sensors 618, e.g., physical intrusion sensors.

In embodiments, electronic accessory system 600 may use any number of power sources such as a USB power source, a lithium battery, or a coin cell (not shown). For example, electronic accessory system 600 may be generally powered via a USB connection as its main source of power. Once USB power becomes temporary or permanently unavailable, accessory system 600 may switch to a backup lithium battery or a coin cell to continue to power protective sensors, etc., for example, to keep the secrets alive in memory 606 (e.g., volatile memory) until the voltage in the coin cell drops to a level that no longer supports the tamper detection sensors. Volatile memory 606 may be used such that secrets may be quickly erased in the event of an intrusion attempt. In embodiments, upon restoring power, accessory system 600 may resume by reenergizing tamper detection sensors 618 and using PUF circuit 510 to re-generate the secret key to its original value.

It is noted that without a backup battery, secrets may be exposed to a sophisticated attacker, who may access system 600 to perform circuit modifications without being detected, such that once secure electronic accessory system 600 is powered after having lost power, there will be no trace indicating that system 600 has been invaded and manipulated. Therefore, in embodiments, to provide a high level of security even in no-power scenarios, secure boundary 620 may be used without having to rely on common battery-backed sensor systems.

In embodiments, memory 606 may be non-volatile memory protected by secure boundary 620 that may be implemented as a protective active electric circuit that is communicatively coupled with one or more components of secure electronic accessory system 600 and designed to detect physical intrusion attempts into any of the devices within system 600 that may comprise sensitive data. Boundary 620 may represent an envelope-like environment that may be placed in close proximity to or entirely surround one or more sensitive circuit components. In embodiments, boundary 620 may be implemented as an active electrical mesh that is configured to monitor the physical integrity of system 600 to detect indicia of physical tampering. In embodiments, to simplify the design, only portions of system 600 that contain to-be-protected sensitive circuit elements are wrapped by boundary 620. In embodiments, boundary 620 represents the equivalent of a one-way function that is designed to make it extremely difficult to reverse-engineer the structure of boundary 620.

In operation, boundary 620 may be use to actively monitor circuit 600 for signs of intrusion such that secret keys and sensitive information stored in memory 606 can be immediately erased upon detecting signs of a potential attack, thereby rendering the attack futile.

In embodiments, at a power-up condition, boundary 620 may receive a query signal and, depending on the response to the signal, secure electronic accessory system 600 may detect whether boundary 620 has been modified, e.g., as a result of an attempt to tamper with accessory system 600. The query signal may be a dynamic, random signal that is transmitted through wires of boundary 620 to check their validity. If the response received from boundary 620 is valid, accessory system 600 may signal readiness to initiate a routine process.

In embodiments, mechanical force asserted on boundary 620 will likely destroy its electrical configuration when the circuit is probed or altered, which typically causes irreversible damage to the physical structure. In embodiments, once tampering is detected, electrical circuit characteristics of boundary 620 will be sufficiently different so as to indicate an electrical change when compared to the original, pre-attack condition of boundary 620 that may serve as a reference point. In embodiments, by generating a signal different than an expected reference signal, the now modified boundary 620 enables verification of the integrity of circuit 600 and, thus, the detection of unauthorized access attempt. Additional protection may be provided by alerting systems internal or external to accessory system 600 of any tampering event on boundary 620, thereby, significantly increasing the security of accessory system 600 and preventing the capture of sensitive information by potential attackers. In embodiments, crypto engine 502 may be directly coupled to boundary 620 such that crypto engine 502 may directly verify the integrity of boundary 620.

One skilled in the art will appreciate that other topologies for boundary 620 may be employed without deviating from the scope of the present disclosure. In embodiments, crypto engine 502 is configured to transmit secret keys under secure conditions to ensure that no sensitive data is accessible to attackers at any moment in time and that the security of accessory system 600 has not been compromised.

Figure 7:
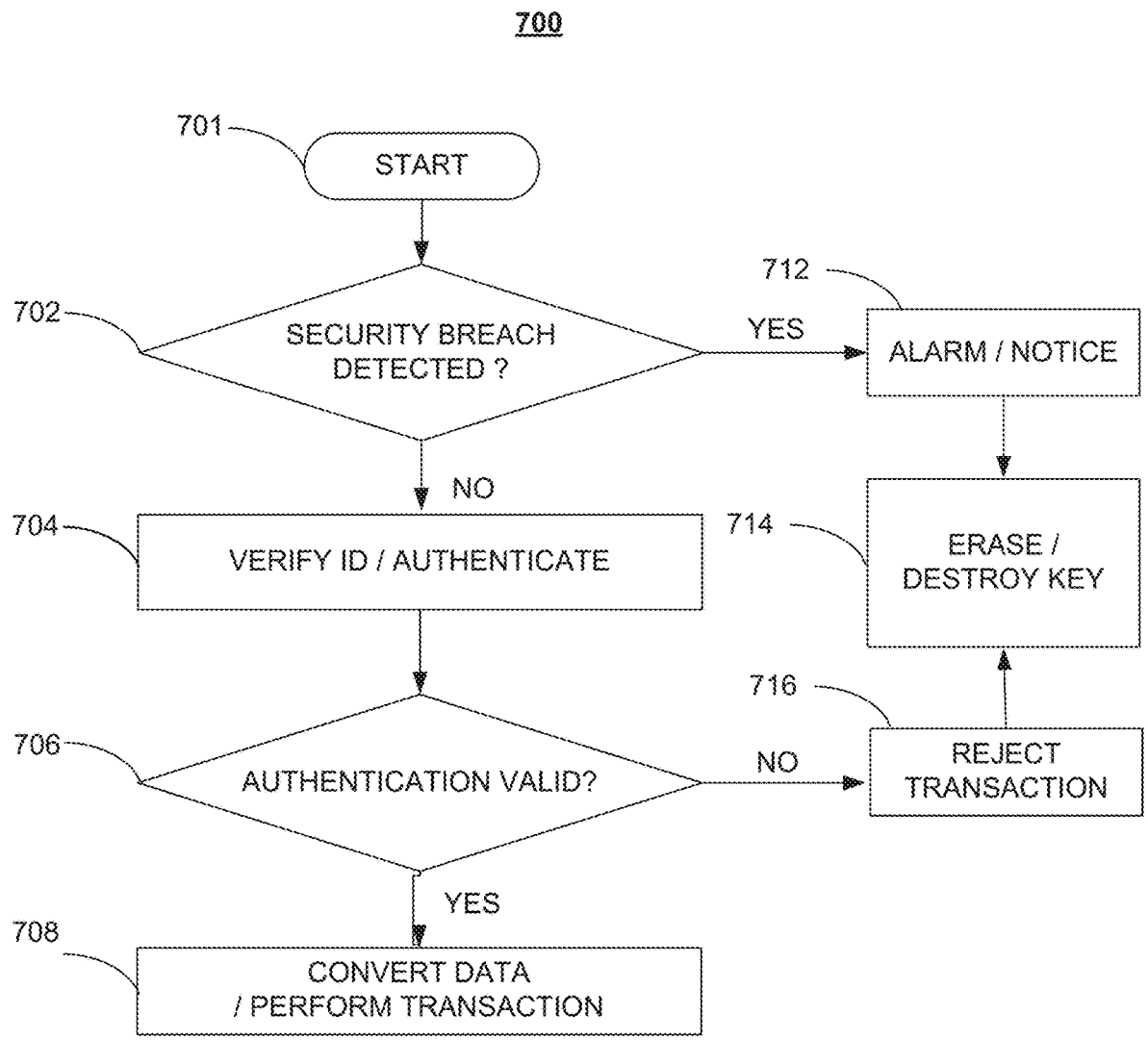
FIG. 7 is a flowchart of an illustrative process for ripple cancellation in accordance with various embodiments of the present disclosure.

FIG. 7 is a flowchart of an exemplary tamper detection process for a secure electronic contact lens system according to various embodiments of the present disclosure. In embodiments, in response to the electronic accessory device detecting, at step 702, a security breach or the presence of a predetermined event, process 700, at step 714, an encryption key and/or other secrets are permanently erased from a memory device within the accessory device, such that a PUF-generated secret is no longer available and, as a result, there is no key present that could be discovered, stolen, and used to access protected information.

In embodiments, the memory device may be irreversibly destroyed, for example, after a number of attempts to compromise system security have been detected, and the electronic contact lens system may be shut down. In addition, an alarm or notice may be generated at step 712.

In embodiments, if at step 702 no security breach/predetermined event is detected, an accessory device as discussed above with reference to FIG. 4 and FIG. 6 may be used to verify the identity of an electronic contact lens as shown in FIG. 1. If, at step 706, identification or authentication fails, process 700 may, at step 716, reject any transaction and resume with step 714; otherwise, process 700 may, perform a transaction that may comprise converting data, at step 708.

Figure 8:
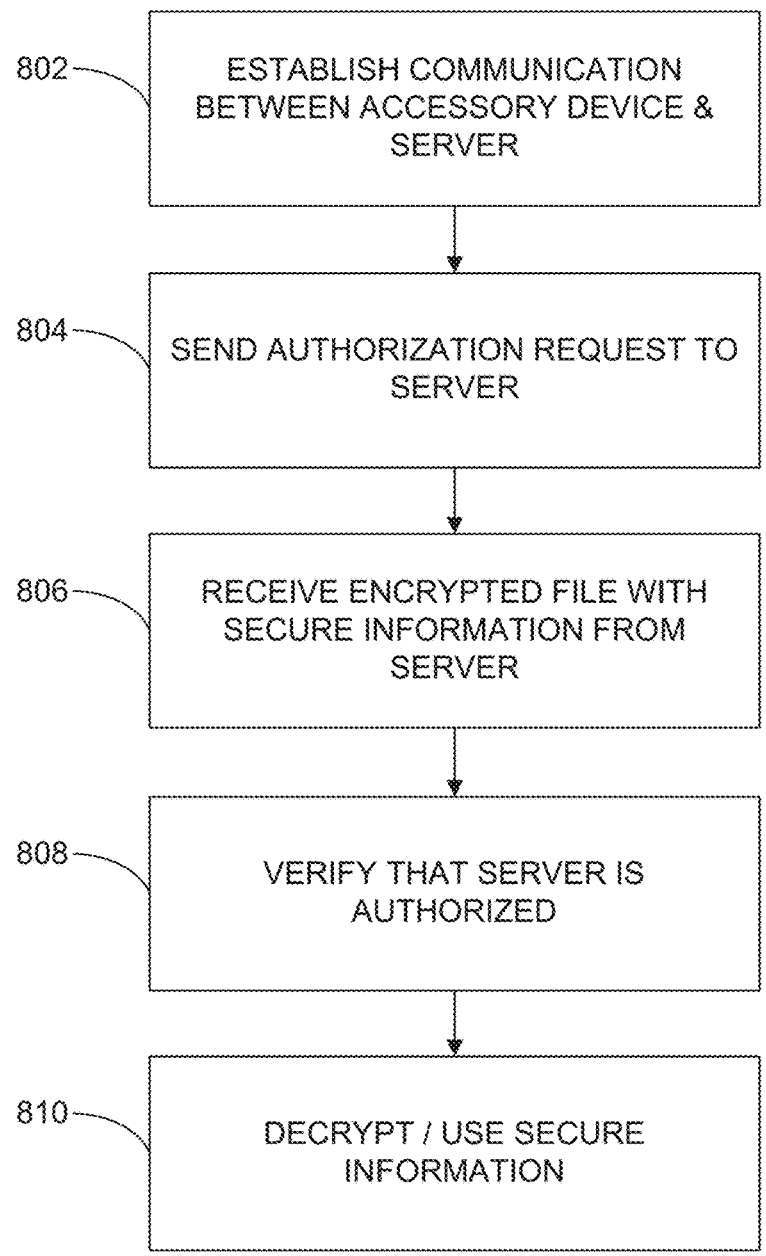
FIG. 8 is a flowchart of an illustrative authentication process for a secure electronic contact lens system in accordance with various embodiments of the present disclosure.
Figure 9:
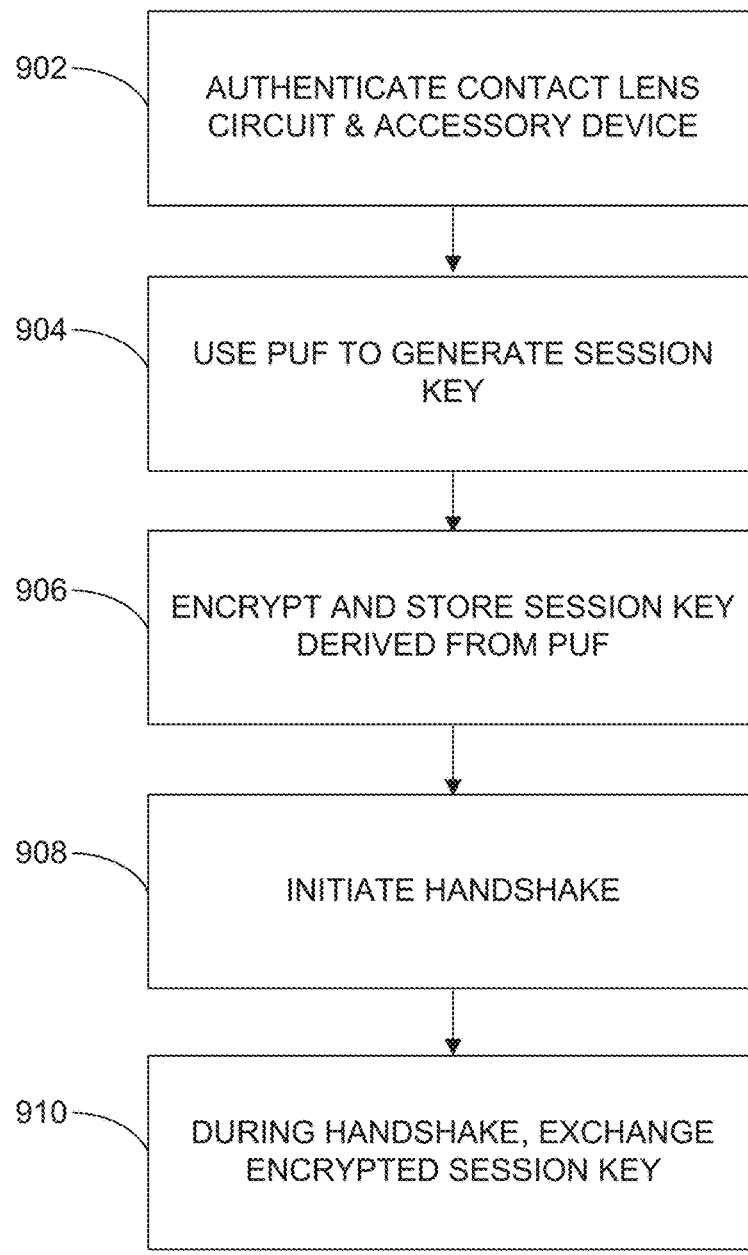
FIG. 9 is a flowchart illustrating an encryption process for a secure electronic contact lens system in accordance with various embodiments of the present disclosure.

FIG. 8 is a flowchart of an illustrative authentication process for a secure electronic contact lens system in accordance with various embodiments of the present disclosure. Authentication process 800 begins at step 802 when communication is established between an accessory device and a server. At step 804, an authorization request is sent to the server. At step 806, an encrypted file and secure information are received from the server. At step 808, it is verified that the server is authorized. Finally, at step 810, the secure information may be decrypted and used. The use of cryptography in encrypting data may be implemented using either a stream cypher or block encryption technique prior to transmission within the wireless channel FIG. 9 is a flowchart illustrating an encryption process for a secure electronic contact lens system in accordance with various embodiments of the present disclosure.

Encryption process 900 begins at step 902 when a contact lens circuit and an accessory device are authenticated. At step 904, a PUF is used to generates a session key. At step 906, a key derived from the session key is encrypted. At step 908, a handshake is initiated, during the handshake, the encrypted session key is exchanged.

A person of ordinary skill in the art will appreciate that process 900 may comprise additional steps, such as steps for compensating or accounting for processing delays (e.g., inherent delays), steps for processing data (including establishing communication using any communication protocol known in the art), and steps to increase data accuracy (e.g., via calibration).

Figure 10:
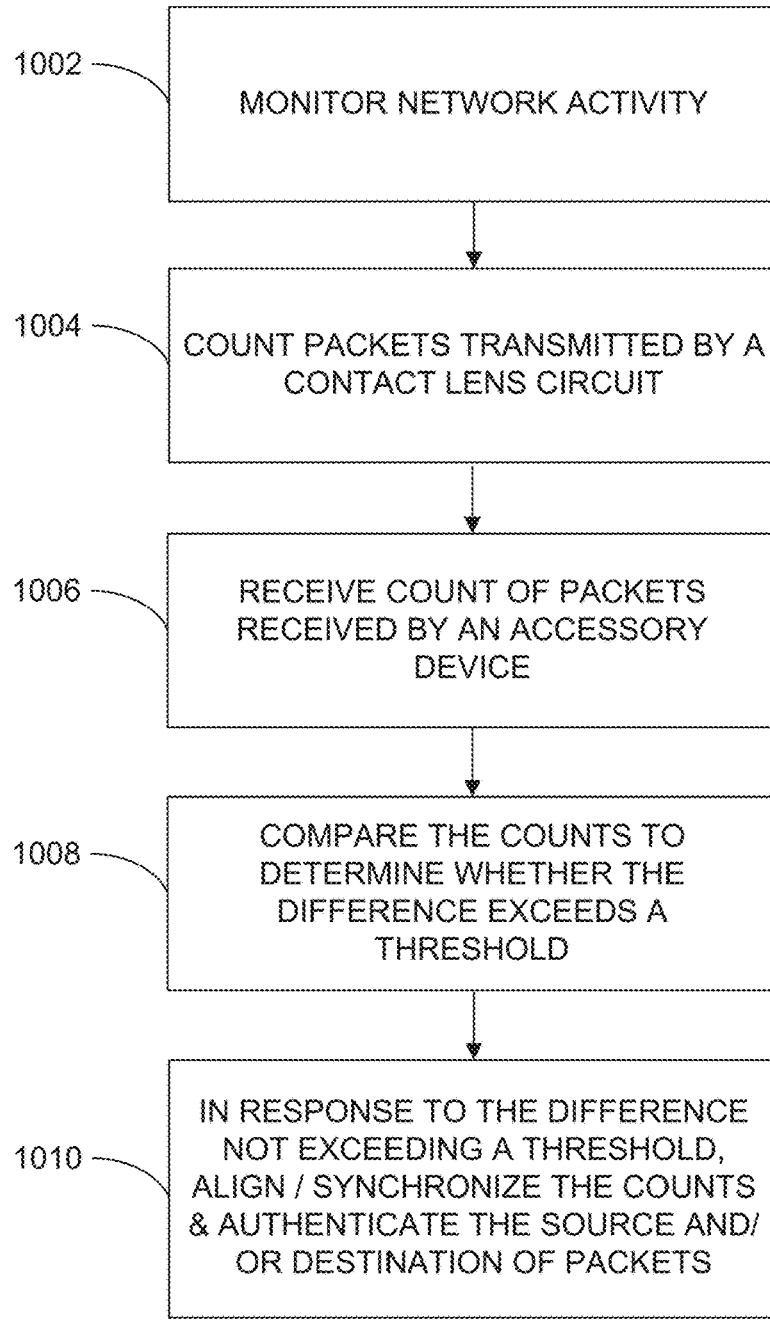
FIG. 10 is a flowchart of an illustrative encryption process for a secure electronic contact lens system according to various embodiments of the present disclosure.

FIG. 10 is a flowchart of an illustrative encryption process for a secure electronic contact lens system according to various embodiments of the present disclosure. Process 1000 begins at step 1002 by monitoring network activity. At step 1004, packets transmitted by a contact lens system are counted. At step 1006, a count of packets that have been received by an accessory device is obtained. At step 1008, the counts are compared in order to determine, e.g., whether a difference in the counts exceeds a threshold level. Finally, at step 1010, in response to the difference in counts not exceeding the threshold level, counts are synchronized or aligned and the source and/or destination of packets is authenticated.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 11:
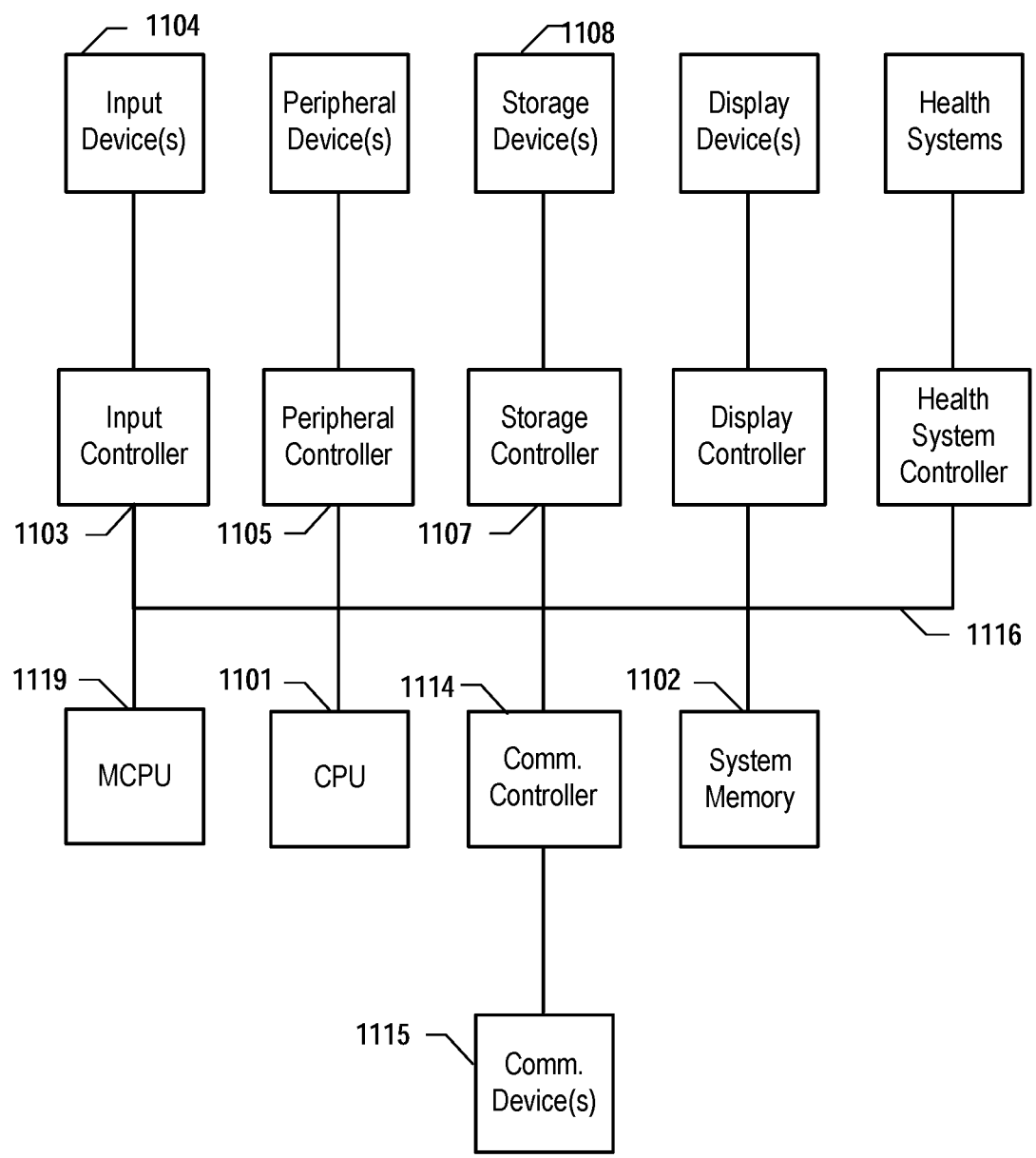
FIG. 11 depicts a simplified block diagram of a computing device such as an accessory device or system according to embodiments of the present disclosure.

FIG. 11 depicts a simplified block diagram of a computing device such as an accessory device or system according to embodiments of the present disclosure. It will be understood that the functionalities shown for system 1100 may operate to support various embodiments of a computing system—although it shall be understood that a computing system may be differently configured and include different components, including having fewer or more components as depicted in FIG. 11.

As illustrated in FIG. 11, the computing system 1100 includes one or more central processing units (CPU) 1101 that provides computing resources and controls the computer. CPU 1101 may be implemented with a microprocessor or the like, and may also include one or more mathematical processing units (MCPU) 1119 and/or a floating-point coprocessor for mathematical computations. System 1100 may also include a system memory 1102, which may be in the form of random-access memory (RAM), read-only memory (ROM), or both.

A number of controllers and peripheral devices may also be provided, as shown in FIG. 11. An input controller 1103 represents an interface to various input device(s) 1104. The computing system 1100 may also include a storage controller 1107 for interfacing with one or more storage devices 1108 that might be used to record programs of instructions for operating systems, utilities, and applications, which may include embodiments of programs that implement various aspects of the present invention. Storage device(s) 1108 may also be used to store processed data or data to be processed in accordance with the invention. The computing system 1100 may also include one or more peripheral controllers or interfaces 1105 for one or more peripherals. A communications controller 1114 may interface with one or more communication devices 1115, which enables the system 1100 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A secure wireless contact lens system comprising:
   an accessory device comprising:
      a first key stored in a first memory;
      a handshake unit coupled to receive the first key, the handshake unit performs a handshake routine to define a plurality of parameters used during a session;
      a first crypto core that receives data and the first key, the first crypto core uses the first key to encrypt at least some of the data to generate a cipher text; and
      a transmitter coupled to the first crypto core, the transmitter, in response to receiving the cipher text from the crypto core, transmits the cipher text via a wireless communication channel; and
   a contact lens comprising:
      a second key stored in a second memory, the second key is derived from a random session key generated within the contact lens, the random session key serves as a master key to derive the second key;
      an energy unit that harvests power from an electromagnetic field provided by the accessory device;
      a receiver to receive the cipher text via the wireless communication channel; and
      a second crypto core coupled to receive power from the energy unit and receive the cipher text, the second crypto core decrypts the cipher text using the second key.

2. The secure wireless contact lens system according to claim 1 wherein the second crypto cores comprises a physically unclonable function (PUF) interface to receive the random session key that has been generated by a PUF.

3. The secure wireless contact lens system according to claim 2 wherein the random session key is not stored in a nonvolatile memory.

4. The secure wireless contact lens system according to claim 1 wherein the first crypto core comprises at least one of a block encryption unit and a stream cipher unit to perform an encryption operation.

5. The secure wireless contact lens system according to claim 1 wherein the second crypto core comprises a counter to count packets received by the accessory device.

6. The secure wireless contact lens system according to claim 5 wherein the second crypto core comprises a handshake unit that applies a handshake protocol to the packets.

7. The secure wireless contact lens system according to claim 1 wherein at least one of the first and the second crypto cores comprises an authentication module that causes steps to be performed comprising:
   monitoring a network activity;
   obtaining a first count of packets that have been transmitted by the contact lens;
   obtaining a second count of packets that have been received by the accessory device;
   comparing the first and second count to determine whether a difference in the counts exceeds a threshold level;
   in response to the difference in the counts not exceeding the threshold level, synchronizing the counts; and
   authenticating at least one of a source and a destination of a packet.

8. The secure wireless contact lens system according to claim 1 wherein at least one of the first and the second crypto cores comprises an authentication module that causes steps to be performed comprising:
  establishing a communication between the accessory device and a server;
  sending an authorization request to the server;
  receiving, from the server, an encrypted file and secure information;
  verifying that the server is authorized; and
  decrypting and using the secure information.

9. A secure wireless contact lens comprising:
  a transceiver that transmits and receives cipher text via a wireless communication channel;
  a handshake unit that performs a handshake operation with an accessory device that defines at least one secure parameter used during a session;
  a memory that stores an encryption key derived from a random session key, the random session key is generated within the secure wireless contact lens and serves as a master key to derive the encryption key;
  an energy unit that harvests power from an electromagnetic field provided by the accessory device; and
  a crypto core coupled to the transceiver, the memory and energy unit, the crypto core encrypts, using the encryption key, to encrypt data to be transmitted on the wireless communication channel and to decrypt cipher text received from the accessory device.

10. The secure wireless contact lens according to claim 9 wherein the cipher text has been generated by an accessory device that uses an encryption key to encrypt at least some of the data to generate the cipher text.

11. The secure wireless contact lens according to claim 10 wherein the crypto core comprises a counter to count packets received by the accessory device.

12. The secure wireless contact lens according to claim 9 wherein the crypto core comprises a physically unclonable function (PUF) interface to receive the random session key that has been generated by a PUF.

13. The secure wireless contact lens according to claim 9 wherein the crypto core comprises at least one of a block encryption unit and a stream cipher unit to perform a decryption operation.

14. The secure wireless contact lens according to claim 13 wherein the crypto core comprises a handshake unit that applies a handshake protocol to the packets.

* * * * *